United States Patent
Dhillon et al.

(10) Patent No.: US 9,701,200 B2
(45) Date of Patent: Jul. 11, 2017

(54) SELECTABLE CABIN CONDITIONING DURING ELECTRIFIED VEHICLE CHARGING

(71) Applicant: Ford Global Technologies, LLC, Dearborn, MI (US)

(72) Inventors: Jaswant S. Dhillon, Novi, MI (US); Marc Jonathon Lucas, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 47 days.

(21) Appl. No.: 14/814,917

(22) Filed: Jul. 31, 2015

(65) Prior Publication Data

US 2017/0028851 A1    Feb. 2, 2017

(51) Int. Cl.
*H02J 7/14* (2006.01)
*B60K 35/00* (2006.01)

(52) U.S. Cl.
CPC ...... *B60K 35/00* (2013.01); *B60K 2350/1076* (2013.01)

(58) Field of Classification Search
CPC . Y02T 10/7005; Y02T 90/14; Y02T 10/7077; Y02T 90/16; Y02T 90/162; B60K 2350/1028; B60K 35/00; B60K 2001/005; B60K 6/28; B60H 1/00278; B60H 1/00642; B60H 1/00764; H01M 10/486; H01M 2220/20; H01M 10/625
USPC .......... 701/32.4, 22, 36, 48, 487; 180/65.21; 320/104, 109, 153
See application file for complete search history.

(56) References Cited

U.S. PATENT DOCUMENTS

| | | | |
|---|---|---|---|
| 8,504,219 B2 | 8/2013 | Kim et al. | |
| 8,712,677 B2 * | 4/2014 | Miura | G01C 21/00 180/65.26 |
| 9,352,635 B1 * | 5/2016 | Schepmann | B60H 1/00392 |
| 2009/0114463 A1 * | 5/2009 | DeVault | B60K 6/365 180/65.29 |
| 2011/0153140 A1 * | 6/2011 | Datta | B60R 16/02 701/31.4 |
| 2012/0109519 A1 | 5/2012 | Uyeki | |
| 2012/0158241 A1 | 6/2012 | Tate, Jr. et al. | |
| 2012/0233077 A1 | 9/2012 | Tate, Jr. et al. | |
| 2013/0179057 A1 | 7/2013 | Fisher et al. | |

* cited by examiner

*Primary Examiner* — Dalena Tran
(74) *Attorney, Agent, or Firm* — Frank MacKenzie; Brooks Kushman P.C.

(57) ABSTRACT

A vehicle cabin conditioning system may include an ambient temperature sensor, a cabin temperature sensor, a user interface, and a controller programmed to present, via the interface, an alert in response to a cabin conditioning demand created by a temperature difference between ambient and cabin temperatures as detected by the sensors, wherein the alert indicates impact of the demand on vehicle charging.

18 Claims, 5 Drawing Sheets

SELECTABLE CABIN CONDITIONING DURING ELECTRIFIED VEHICLE CHARGING

TECHNICAL FIELD

Disclosed herein are cabin conditioning systems.

BACKGROUND

Drivers of electric vehicles often leave a vehicle during vehicle charging. Some vehicles are configured to condition the vehicle cabin (e.g, heat or cool the cabin) during charging in an effort to maximize energy efficiency when driving after charging. However, such conditioning may lead to longer charge times, as well as higher charging costs, due to the increased power required to condition the cabin. Often times, drivers are unaware of the increased time/costs associated with the conditioning.

SUMMARY

A vehicle cabin conditioning system may include an ambient temperature sensor, a cabin temperature sensor, a user interface, and a controller programmed to present, via the interface, an alert in response to a cabin conditioning demand created by a temperature difference between ambient and cabin temperatures as detected by the sensors, wherein the alert indicates impact of the demand on vehicle charging.

A system for creating cabin conditioning alerts during vehicle charging at a charge station may include a vehicle interface, and a controller programmed to receive a waypoint, and to present via the interface at least one alert to indicate impact of vehicle conditioning on vehicle charging based on a distance between the waypoint and charge station.

A vehicle interface system may include a vehicle interface and a controller programmed to present, via the interface, a cabin conditioning screen including at least one alert that indicates a change to vehicle charge time based on predicted cabin conditioning during vehicle charging.

BRIEF DESCRIPTION OF THE DRAWINGS

The embodiments of the present disclosure are pointed out with particularity in the appended claims. However, other features of the various embodiments will become more apparent and will be best understood by referring to the following detailed description in conjunction with the accompanying drawings in which:

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Drivers of electric vehicles often leave a vehicle unattended during vehicle charging. Some vehicles are configured to condition the vehicle cabin (e.g, heat or cool the vehicle cabin) during charging in an effort to minimize the amount of conditioning that occurs after charging. However, such conditioning may lead to longer charge times, as well as higher charging costs, due to the increased power required to condition the cabin during charging. Often times, drivers are unaware of the increased time and/or costs associated with the conditioning. Described herein is a cabin conditioning system configured to alert the user via an interface or other form as to adverse effects of conditioning a vehicle during charging.

Figure 1A:
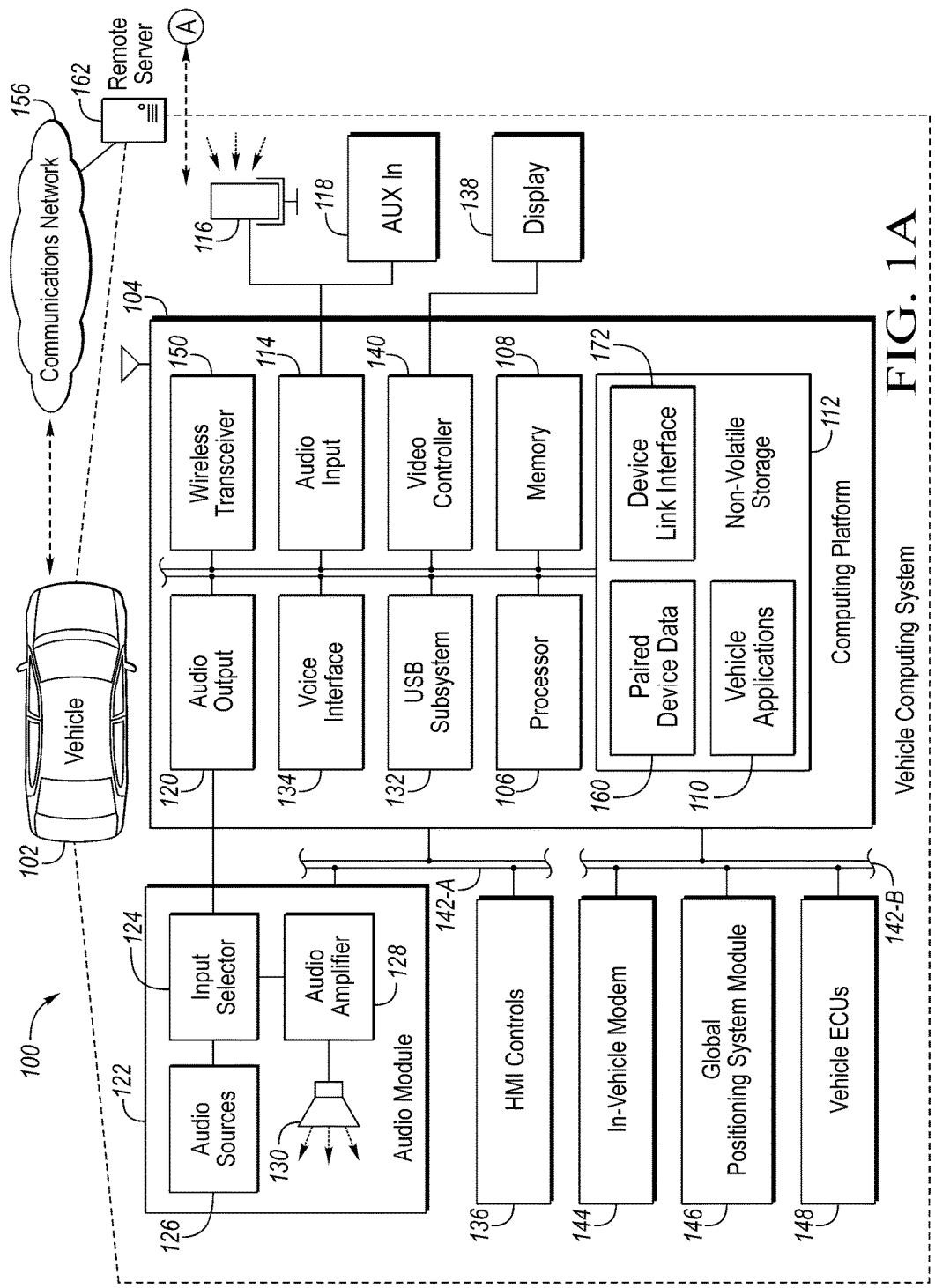
FIGS. 1A and 1B illustrate an example diagram of a system that may be used to provide telematics services to a vehicle.
Figure 1B:
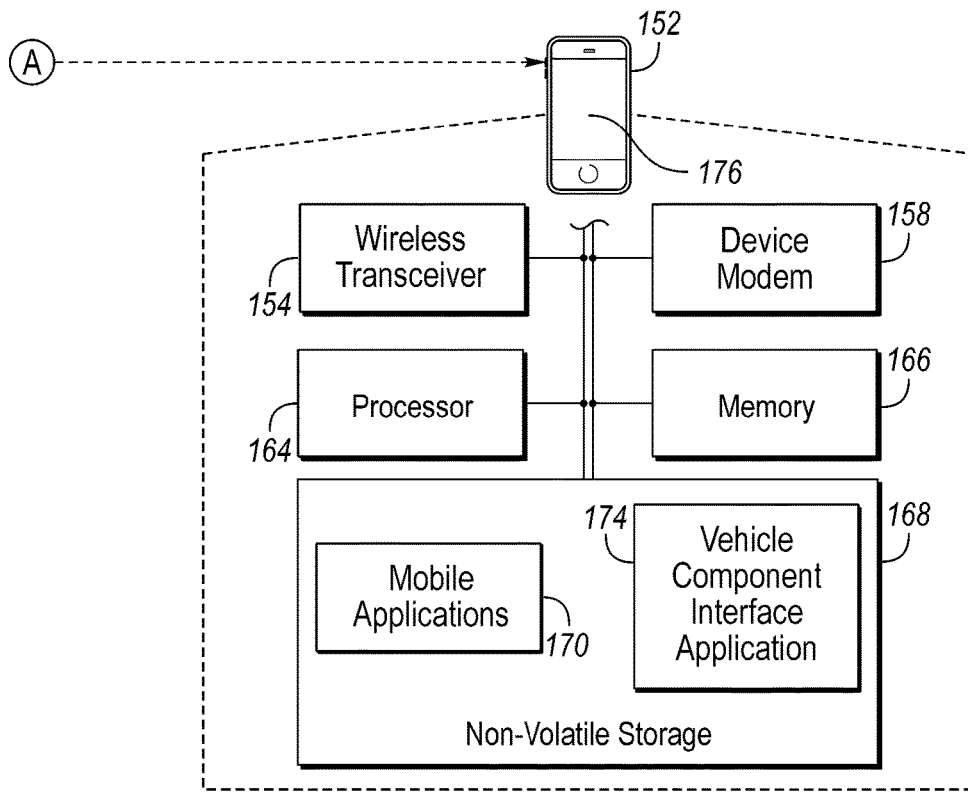

FIGS. 1A and 1B illustrate an example diagram of a system 100 that may be used to provide telematics services to a vehicle 102. The vehicle 102 may be one of various types of passenger vehicles, such as a crossover utility vehicle (CUV), a sport utility vehicle (SUV), a truck, a recreational vehicle (RV), a boat, a plane or other mobile machine for transporting people or goods. Telematics services may include, as some non-limiting possibilities, navigation, turn-by-turn directions, vehicle health reports, local business search, accident reporting, and hands-free calling. In an example, the system 100 may include the SYNC system manufactured by The Ford Motor Company of Dearborn, Mich. It should be noted that the illustrated system 100 is merely an example, and more, fewer, and/or differently located elements may be used.

The computing platform 104 may include one or more processors 106 and controllers configured to perform instructions, commands and other routines in support of the processes described herein. For instance, the computing platform 104 may be configured to execute instructions of vehicle applications 110 to provide features such as navigation, accident reporting, satellite radio decoding, and hands-free calling. Such instructions and other data may be maintained in a non-volatile manner using a variety of types of computer-readable storage medium 112. The computer-readable medium 112 (also referred to as a processor-readable medium or storage) includes any non-transitory medium (e.g., a tangible medium) that participates in providing instructions or other data that may be read by the processor 106 of the computing platform 104. Computer-executable instructions may be compiled or interpreted from computer programs created using a variety of programming languages and/or technologies, including, without limitation, and either alone or in combination, Java, C, C++, C#, Objective C, Fortran, Pascal, Java Script, Python, Perl, and PL/SQL.

The computing platform 104 may be provided with various features allowing the vehicle occupants to interface with the computing platform 104. For example, the computing platform 104 may include an audio input 114 configured to receive spoken commands from vehicle occupants through a connected microphone 116, and auxiliary audio input 118 configured to receive audio signals from connected devices. The auxiliary audio input 118 may be a physical connection, such as an electrical wire or a fiber optic cable, or a wireless input, such as a BLUETOOTH audio connection. In some examples, the audio input 114 may be configured to provide audio processing capabilities, such as pre-amplification of low-level signals, and conversion of analog inputs into digital data for processing by the processor 106.

The computing platform 104 may also provide one or more audio outputs 120 to an input of an audio module 122 having audio playback functionality. In other examples, the computing platform 104 may provide the audio output to an occupant through use of one or more dedicated speakers (not illustrated). The audio module 122 may include an input selector 124 configured to provide audio content from a selected audio source 126 to an audio amplifier 128 for playback through vehicle speakers 130 or headphones (not illustrated). The audio sources 126 may include, as some examples, decoded amplitude modulated (AM) or frequency modulated (FM) radio signals, and audio signals from compact disc (CD) or digital versatile disk (DVD) audio playback. The audio sources 126 may also include audio received from the computing platform 104, such as audio content generated by the computing platform 104, audio content decoded from flash memory drives connected to a universal serial bus (USB) subsystem 132 of the computing platform 104, and audio content passed through the computing platform 104 from the auxiliary audio input 118.

The computing platform 104 may utilize a voice interface 134 to provide a hands-free interface to the computing platform 104. The voice interface 134 may support speech recognition from audio received via the microphone 116 according to grammar associated with available commands, and voice prompt generation for output via the audio module 122. In some cases, the system may be configured to temporarily mute or otherwise override the audio source specified by the input selector 124 when an audio prompt is ready for presentation by the computing platform 104 and another audio source 126 is selected for playback.

The computing platform 104 may also receive input from human-machine interface (HMI) controls 136 configured to provide for occupant interaction with the vehicle 102. For instance, the computing platform 104 may interface with one or more buttons or other HMI controls configured to invoke functions on the computing platform 104 (e.g., steering wheel audio buttons, a push-to-talk button, instrument panel controls, etc.). The computing platform 104 may also drive or otherwise communicate with one or more displays 138 configured to provide visual output to vehicle occupants by way of a video controller 140. In some cases, the display 138 may be a touch screen further configured to receive user touch input via the video controller 140, while in other cases the display 138 may be a display only, without touch input capabilities.

Figure 2:
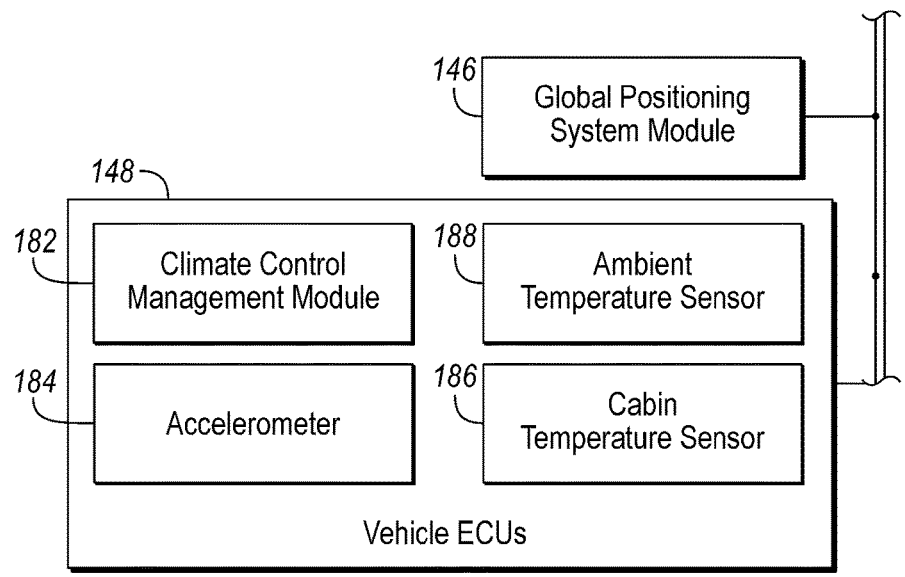
FIG. 2 illustrates an example block diagram of a portion of the vehicle charging system.

The computing platform 104 may be further configured to communicate with other components of the vehicle 102 via one or more in-vehicle networks 142. The in-vehicle networks 142 may include one or more of a vehicle controller area network (CAN), an Ethernet network, and a media oriented system transfer (MOST), as some examples. The in-vehicle networks 142 may allow the computing platform 104 to communicate with other vehicle 102 systems, such as a vehicle modem 144 (which may not be present in some configurations), a global positioning system (GPS) module 146 configured to provide current vehicle 102 location and heading information, and various vehicle ECUs 148 configured to cooperate with the computing platform 104. As some non-limiting possibilities, the vehicle ECUs 148 may include a powertrain control module configured to provide control of engine operating components (e.g., idle control components, fuel delivery components, emissions control components, etc.) and monitoring of engine operating components (e.g., status of engine diagnostic codes); a body control module configured to manage various power control functions such as exterior lighting, interior lighting, keyless entry, remote start, and point of access status verification (e.g., closure status of the hood, doors and/or trunk of the vehicle 102); a radio transceiver module configured to communicate with key fobs or other local vehicle 102 devices; and a climate control management module (as shown as 182 in FIG. 2) configured to provide control and monitoring of heating and cooling system components (e.g., compressor clutch and blower fan control, temperature sensor information, etc.), and other sensors including an accelerometer 184 (as shown in FIG. 2), temperature sensors 186, 188 (as shown in FIG. 2), etc.

As shown, the audio module 122 and the HMI controls 136 may communicate with the computing platform 104 over a first in-vehicle network 142-A, and the vehicle modem 144, GPS module 146, and vehicle ECUs 148 may communicate with the computing platform 104 over a second in-vehicle network 142-B. In other examples, the computing platform 104 may be connected to more or fewer in-vehicle networks 142. Additionally or alternately, one or more HMI controls 136 or other components may be connected to the computing platform 104 via different in-vehicle networks 142 than shown, or directly without connection to an in-vehicle network 142.

The computing platform 104 may also be configured to communicate with mobile devices 152 of the vehicle occupants. The mobile devices 152 may be any of various types of portable computing device, such as cellular phones, tablet computers, smart watches, laptop computers, portable music players, or other devices capable of communication with the computing platform 104. In many examples, the computing platform 104 may include a wireless transceiver 150 (e.g., a BLUETOOTH module, a ZIGBEE transceiver, a Wi-Fi transceiver, an IrDA transceiver, an RFID transceiver, etc.) configured to communicate with a compatible wireless transceiver 154 of the mobile device 152. Additionally or alternately, the computing platform 104 may communicate with the mobile device 152 over a wired connection, such as via a USB connection between the mobile device 152 and the USB subsystem 132.

The communications network 156 may provide communications services, such as packet-switched network services (e.g., Internet access, VoIP communication services), to devices connected to the communications network 156. An example of a communications network 156 may include a cellular telephone network. Mobile devices 152 may provide network connectivity to the communications network 156 via a device modem 158 of the mobile device 152. To facilitate the communications over the communications network 156, mobile devices 152 may be associated with unique device identifiers (e.g., mobile device numbers (MDNs), Internet protocol (IP) addresses, etc.) to identify the communications of the mobile devices 152 over the communications network 156. In some cases, occupants of the vehicle 102 or devices having permission to connect to the computing platform 104 may be identified by the computing platform 104 according to paired device data 160 maintained in the storage medium 112. The paired device data 160 may indicate, for example, the unique device identifiers of mobile devices 152 previously paired with the computing platform 104 of the vehicle 102, such that the computing platform 104 may automatically reconnected to the mobile devices 152 referenced in the paired device data 160 without user intervention.

When a mobile device 152 that supports network connectivity is paired with the computing platform 104, the mobile device 152 may allow the computing platform 104 to use the network connectivity of the device modem 158 to communicate over the communications network 156 with the remote telematics services 162. In one example, the computing platform 104 may utilize a data-over-voice plan or data plan of the mobile device 152 to communicate information between the computing platform 104 and the communications network 156. Additionally or alternately, the computing platform 104 may utilize the vehicle modem 144 to communicate information between the computing platform 104 and the communications network 156, without use of the communications facilities of the mobile device 152.

Similar to the computing platform 104, the mobile device 152 may include one or more processors 164 configured to execute instructions of mobile applications 170 loaded to a memory 166 of the mobile device 152 from storage medium 168 of the mobile device 152. In some examples, the mobile applications 170 may be configured to communicate with the computing platform 104 via the wireless transceiver 154 and with the remote telematics services 162 or other network services via the device modem 158. The computing platform 104 may also include a device link interface 172 to facilitate the integration of functionality of the mobile applications 170 into the grammar of commands available via the voice interface 134 as well as into display 138 of the computing platform 104. The device link interfaced 172 may also provide the mobile applications 170 with access to vehicle information available to the computing platform 104 via the in-vehicle networks 142. Some examples of device link interfaces 172 include the SYNC APPLINK component of the SYNC system provided by The Ford Motor Company of Dearborn, Mich., the CarPlay protocol provided by Apple Inc. of Cupertino, Calif., or the Android Auto protocol provided by Google, Inc. of Mountain View, Calif. The vehicle component interface application 174 may be once such application installed to the mobile device 152.

The vehicle component interface application 174 of the mobile device 152 may be configured to facilitate access to one or more vehicle 102 features made available for device configuration by the vehicle 102. In some cases, the available vehicle 102 features may be accessible by a single vehicle component interface application 174, in which case such the vehicle component interface application 174 may be configured to be customizable or to maintain configurations supportive of the specific vehicle 102 brand/model and option packages. In an example, the vehicle component interface application 174 may be configured to receive, from the vehicle 102, a definition of the features that are available to be controlled, display a user interface descriptive of the available features, and provide user input from the user interface to the vehicle 102 to allow the user to control the indicated features. As exampled in detail below, an appropriate mobile device 152 to display the vehicle component interface application 174 may be identified (e.g. mobile display 176), and a definition of the user interface to display may be provided to the identified vehicle component interface application 174 for display to the user.

Systems such as the system 100 may require mobile device 152 pairing with the computing platform 104 and/or other setup operations. However, as explained in detail below, a system may be configured to allow vehicle occupants to seamlessly interact with user interface elements in their vehicle or with any other framework-enabled vehicle, without requiring the mobile device 152 or wearable device 202 to have been paired with or be in communication with the computing platform 104.

FIG. 2 illustrates an example diagram of a portion of the system 100. As explained above, the vehicle ECU 148 may include certain vehicle systems and control units such as a climate control management module 182 (hereinafter referred to as climate module 182), accelerometer 184, cabin temperature sensor 186 (also referred to as cabin sensor 186), and ambient temperature sensor 188 (also referred to as ambient sensor 188). The climate module 182 may be configured to manage certain climate controls within the vehicle 102. This may include heating and cooling the vehicle cabin. The climate module 182 may be configured to control air flow, vents, air temperature, etc., to heat and cool the vehicle cabin based on user preferences and presets, and may also respond to certain user inputs via the HMI controls 136 or display 138.

The cabin temperature sensor 186 may be arranged within the vehicle cabin to detect the air temperature therein. The detected temperature may be used by the climate module 182 to adjust the cabin temperature. For example, if the cabin temperature is currently detected by the cabin sensor 186 as being 10 degrees lower than a driver's preset cabin temperature, the climate module 182 may begin to heat the cabin until the preset cabin temperature is reached.

The ambient temperature sensor 188 may be configured to detect an air temperature outside of the vehicle 102. This detected temperature may be used by the climate module 182 to predict certain heating and cooling requirements and demands for cabin conditioning. Cabin conditioning includes heating or cooling the cabin via the vehicle's climate module 182 so as to maintain the cabin at a certain, often user defined, temperature. Often times vehicle cabins are conditioned during vehicle charging so as to lessen the burden on the climate module 182 immediately after charging. That is, instead of letting a vehicle 'cool down' during charging, the vehicle cabin temperature may be maintained at the desired temperature so that the climate module 182 would not have to 'catch up' once the vehicle begins driving once charging is complete.

The accelerometer 184 may be configured to detect an acceleration/deceleration of the vehicle 102 and may be used in combination with data from the GPS module 146 to predict when a vehicle 102 is en-route to a charge station. This is described in more detail below with respect to FIG. 3. The accelerometer 184 may also be used in conjunction with other vehicle systems and features such as cruise control, power management, etc.

Figure 3:
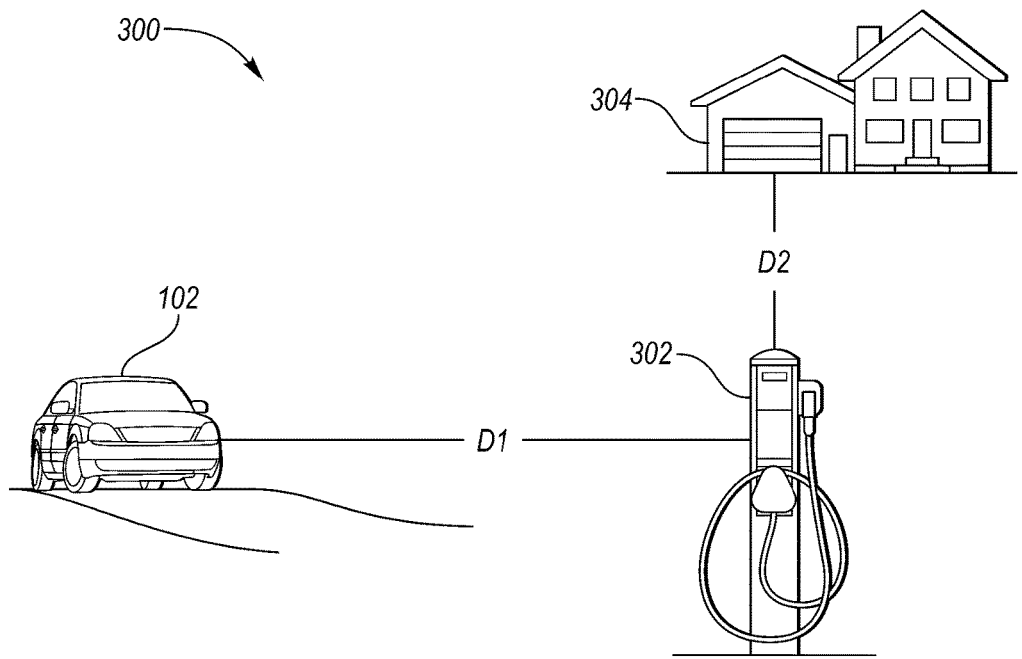
FIG. 3 illustrates an example driving route.

FIG. 3 illustrates an example driving route 300. A vehicle may be a first distance D1 away from a charge station 302. The charge station 302 may be any type of charge station configured to charge an electric battery of the vehicle 102. The charge station 302 may be an electric vehicle charge station or recharging point, and may facilitate power transfer via a plug-in cable, or other forms, such as inductive charging, for example. The charge station 302 may be located at a public location such as a retail establishment, office building, municipal building, home address, etc. In the example route 300, a charge station 302 may be arranged between the vehicle 102 and a waypoint 304 or destination. The waypoint 304 may be the desired endpoint of the driver. For example, the driver may be traveling home from his or her workplace. In the instance where the vehicle 102 may need to re-charge prior to reaching its destination 304, the vehicle 102 may stop at the charge station 302. The charge station 302 may be a second distance D2 from the waypoint 304.

The computing platform 104 may use GPS data from the GPS module 145 and acceleration data from the accelerometer 184 to determine whether the vehicle 102 is likely to stop at the charge station 302. For example, if the vehicle's speed decreases as it approaches the charge station 302, then the likelihood that the vehicle 102 will stop at the charge station to recharge is high. In another example, if the vehicle's speed is constant as it approaches the charge station 302, then the likelihood that the vehicle 102 will stop at the charge station is low.

Upon recognizing that the vehicle 102 will likely be recharging at the charge station 302, the computing platform 104 may perform a vehicle conditioning analysis based on certain factors and data. That is, the computing platform 104 may determine if vehicle conditioning (e.g., vehicle cabin cooling or vehicle cabin heating) is likely to occur, and if so, how such conditioning will affect the recharging at the charge station. For example, if the ambient outdoor temperature is extremely cold, heating of the vehicle 102 during charging may significantly prolong charge time. This is discussed in more detail below.

Figure 4A:
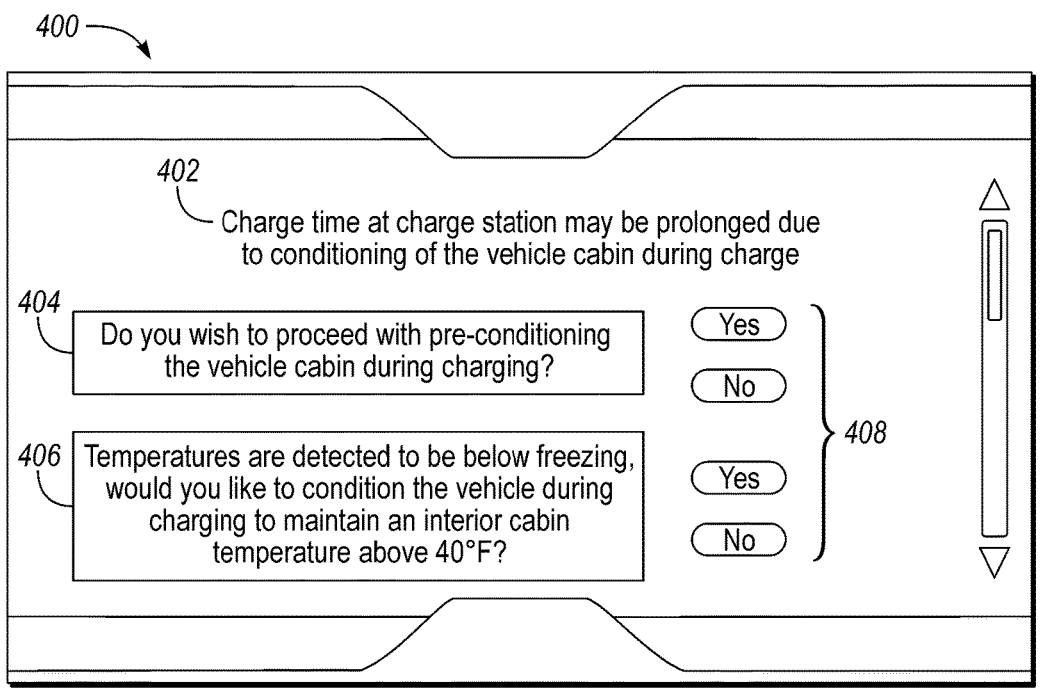
FIGS. 4A-4C illustrate example interface screens for the vehicle charging system.
Figure 4B:
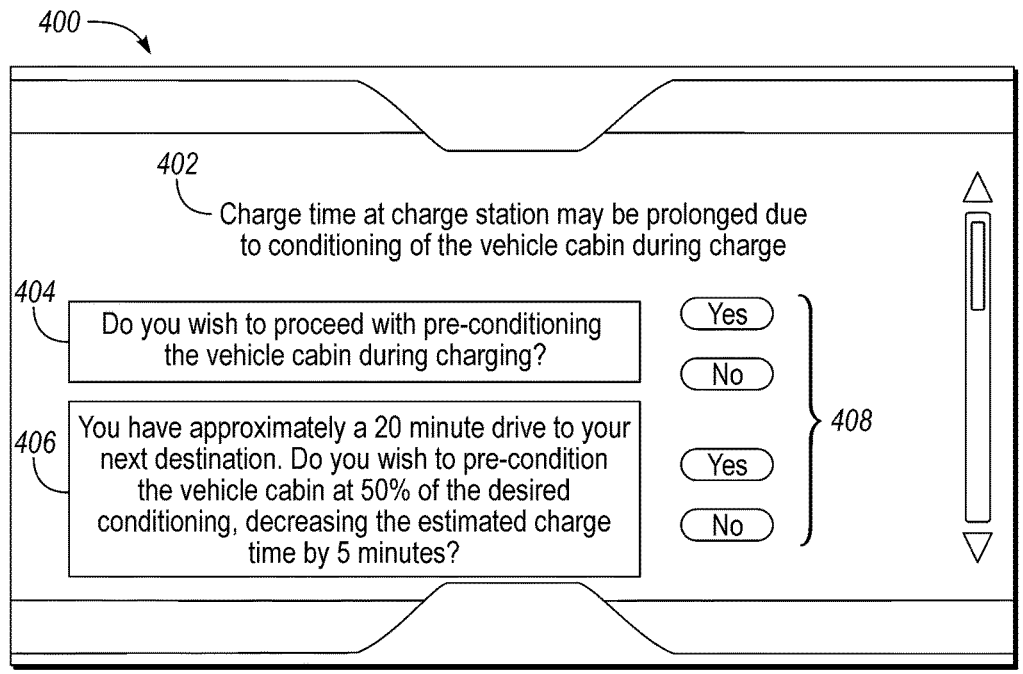
Figure 4C:
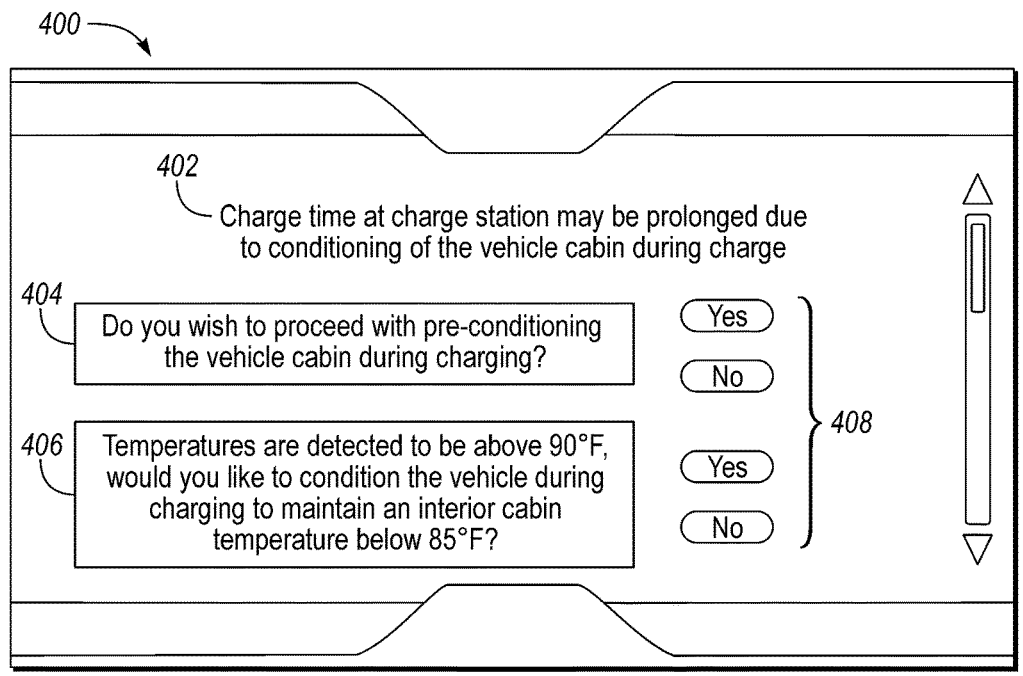

FIGS. 4A-4C illustrate example cabin conditioning screens for an interface 400 providing information and alerts to the driver in response to the vehicle conditioning analysis. These alerts may provide information to the driver in the event that vehicle conditioning is to affect the charge time and/or cost. In one example, the alert may be presented as the vehicle 102 approaches the charge station 302. The interface 400 may be presented via the vehicle display 138 and/or the mobile display 176. The type of alert provided by the interface 400 may depend on several factors including but not limited to the current state of charge, the distance to the destination 304 (e.g., second distance D2), the ambient temperature, user preferences, current state of charge (SOC), etc. The analysis using such example factors is described in more detail below with respect to FIG. 5.

In one example, the interface 400 may be presented to the driver prior to initiation of vehicle charging. That is, as the vehicle 102 approaches the charge station 302, the driver may be alerted via the vehicle display 138, or mobile display 176, that conditioning of the vehicle 102 may affect the charge time and/or costs. Because many drivers leave their vehicles during charging, it may be beneficial to alert the driver prior to his or her stopping at the charge station 302. In another example, however, the driver may be alerted via the mobile display 176 after the driver has left the vehicle. This example may be beneficial when certain factors have changed since the initiation of vehicle charging, such as changes to ambient temperature, changes to the destination 304, etc.

FIG. 4A illustrates an example screen shot having an alert 402. The alert 402 may include a textual alert indicating that the charge time at the charge station may be prolonged due to conditioning of the vehicle 102 during charge. The interface 400 may also present a plurality options, such as a first option 404 and a second option 406. Each option may have a plurality of selectable response option 408 associated therewith.

The first option 404, by way of an example, may ask the driver if he or she would like to proceed with the conditioning. That is, despite knowing that the condition will prolong the charge time and/or costs, would the driver wish to proceed. The selectable response options 408 may include 'yes' and 'no' selectable options. Once one of the selectable options 408 is selected, the computing platform 104 may proceed accordingly (e.g., if 'no' is selected, instruct the climate module 182 to cease conditioning.)

The second option 406, by way of example, may inform the driver that temperatures are below freezing, and may offer an intermediate conditioning option. For example, if temperatures are below freezing and if conditioning is paused during charging, less than ideal circumstances may arise. That is, extremely low temperatures may cause the vehicle cabin to cool down rapidly, as well as require a lot of time and energy to re-heat the cabin. The driver may also experience extremely cold temperatures during charging, especially if he or she remains in the vehicle 102 during charging. Additionally, the amount of time to heat the vehicle 102 after charging may significantly increase. In an effort to compromise the effects of the low temperature with the increased charge time required to off-set the low temperature, the intermediate conditioning option (i.e., second option 046) may permit the driver to condition the vehicle 102 on a limited level. That is, instead of maintaining an interior temperature of 70 degrees Fahrenheit as typically preferred by the driver, the climate module 182 may maintain an interior temperature of 40 degrees Fahrenheit. This option may increase driver comfort, without unnecessarily increasing charge time and/or costs.

In one example, in addition to allowing the driver to select an internal temperature, the driver may select conditioning default preferences such as a desired interior temperature. Other options may be presented such as normal conditioning, b) Eco-mode conditioning, c) Eco-mode plus conditioning. For example: normal=70 F (winter) and 75 (summer); Eco-mode=60 F (winter) and 85 (summer); Eco-mode plus=55 F (winter) and 90 (summer), etc.

FIG. 4B illustrates an example screen shot having an alert 402 and a first option 404, similar to those of FIG. 4A. The second option 406, in this example, may inform the driver that the route from the charge station 302 to the destination 304 may take approximately 20 minutes and may provide another intermediate conditioning option. In this example, because the drive time may be longer than others, the driver may wish to continue with the vehicle conditioning so as to not be uncomfortable for the longer drive. The intermediate conditioning option may include conditioning the vehicle 102 at 50% of the desired conditioning. Thus, while charge time is increased, in this case by approximately five minutes, the driver may still maintain a level of comfort. Also refer to previous comment about 50% option vs. user selectable %.

FIG. 4C illustrates an example screen shot having an alert 402 and options 404, 406 similar to those of FIG. 5B. In this example, however, the ambient temperature detected by the ambient sensor 188 is high, (e.g., above 90 degrees). The intermediate conditioning option in this example gives the driver the option to cool the cabin to a predefine temperature (e.g., 85 degrees). Although this predefined temperature may be higher than that preferred by the driver, it may permit the cabin to be relatively comfortable to the driver, without unduly extending the charge time.

Furthermore, while FIGS. 4A-4C are displayed as a result of factors such as temperature and distance to the destination. Combinations of these factors and others may be taking into consideration when generating alerts and options. In one example, the computing platform 104 may take into consideration both distance and temperature when generating the interface 400. If the second distance D2 to the destination is under a certain amount of miles (e.g., 3 miles, for example), and the ambient temperature is not extreme (e.g., not below freezing and not above 90 degrees Fahrenheit), then a second option 406 may not be presented at least because of the short distance to the destination, as well as the decreased likelihood of discomfort from extreme temperatures.

Furthermore, in some example, the second option 406 may be displayed upon receiving a selected 'yes' response to the first option 404. For example, if a user wishes to continue conditioning during charging regardless of the time/costs, the second option 406 may be displayed. A selected 'yes' to the second option 406 may result in the intermediate condition option being implemented. A selected 'no' to the second option 406 may continue with normal conditioning.

Additional information may also be displayed via the interface 400. In one example, a detailed cost estimate, both in time and money, may be presented. This example may indicate that if a driver proceeds with cabin conditioning during charging, then charging may take an additional amount time, or cost a certain amount.

Figure 5:
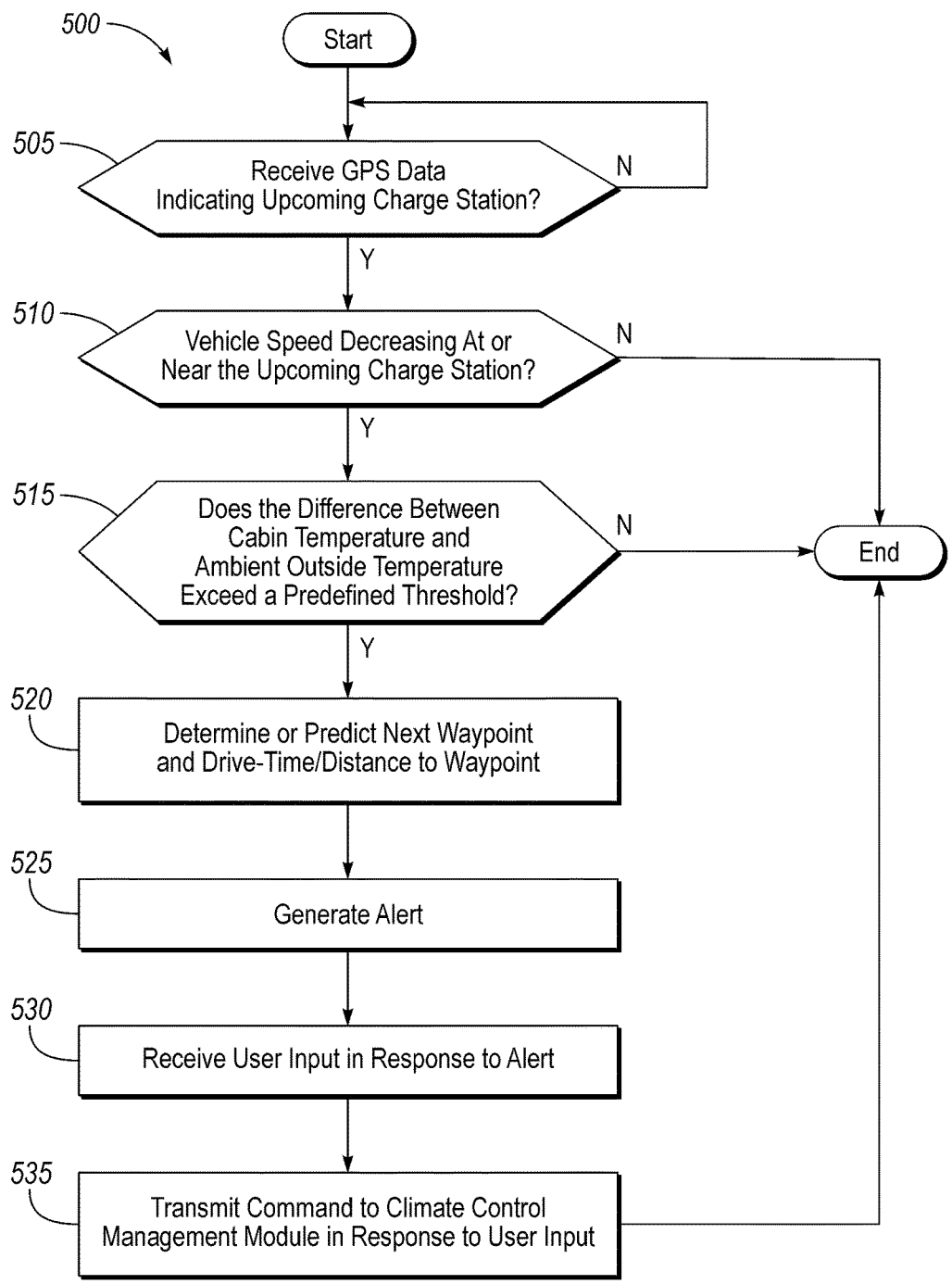
FIG. 5 illustrates an example process for the vehicle charging system.

FIG. 5 illustrates an example process 500 for the cabin conditioning system. The process 500 begins at block 505 where the computing platform 104, or other controller such as one included in mobile device 152 and/or remote server 162, determines whether GPS data indicates that a charge station 302 is nearby. The computing platform 104 may make this determination based on several factors. First, the GPS module 146 may recognize a charge station 302 on or near the current vehicle route 300. That is, between the current location of the vehicle 102 and the waypoint 304, a charge station 302 is located. The GPS module 146 may also recognize a charge station 302 within a certain radius (e.g., 3 miles) of the current location of the vehicle 102. The computing platform 104 may also predict a charge station location based on previous charging at a certain location. That is, if the vehicle 102 has historically charged the vehicle 102 at a certain location, the GPS may recall this data such that the computing platform 104 may recognize the charge station as a potential charge station 302.

Although the examples set forth herein discuss the GPS module 146 as recognizing the charge station location, other devices, controllers and/or modules may also recognize charge station locations. For example, mobile applications, vehicle-to-vehicle communications systems, etc, may all provide, store, and analyze data relating to charge station locations.

Once a charge station 302 is identified at block 505, the computing platform 104 may determine whether the vehicle speed is decreasing at or near the identified charge station 302 at block 510 based on acceleration data from the accelerometer 184. If the computing platform 104 determines that the vehicle 102 is likely to stop at the charge station 302 (e.g., vehicle 102 is approaching the charge station 302 with decreasing speed), the process 500 proceeds to block 515. If not, the process 500 ends.

At block 515, the computing platform 104 determines the difference between the cabin temperature detected by the cabin sensor 186 and the outside ambient temperature detected by the ambient sensor 188. Additionally or alternatively, the cabin temperature may be estimated based on vehicle and ambient conditions. The vehicle conditions may include cabin temperature and battery SOC. Ambient conditions may include ambient temperature. Charge time may be estimated based on the battery SOC and charger power available at that location.

If the difference between the two temperatures exceeds a predefined threshold, the process 500 proceeds to block 520. If not, the process 500 ends. The predefined threshold may be approximately 40 degrees (as an example). That is, if the temperature outside the vehicle 102 is more than 40 degrees greater than the temperature inside the vehicle 102, the process proceeds to block 520. If not, the process ends. The difference between the ambient and cabin temperatures may determine the demand for cabin conditioning. That is, the colder it is outside, the more power required to heat the vehicle cabin.

Although not shown in FIG. 5, the computing platform 104, or other controller, may also determine whether the ambient temperature is extreme, or outside normal temperature parameters. That is, the computing platform 104 may determine whether the ambient temperature is so high, or so low, as to cause discomfort to the driver. For example, if the ambient temperature is below freezing, the temperature may be considered extreme. Moreover, if the temperature is above 90 degrees Fahrenheit, the temperature may be considered extreme. In the former example, it is likely that the cabin temperature does not differ more than 40 degrees from the outside ambient temperature. However, given that 90 degree temperature may lead vehicle cabins to exceed 100 degrees, the computing platform 104 may flag such high temperatures as extreme and proceed as if the predefined temperature threshold was exceeded.

At block 520, the computing platform 104 may determine or predict the next waypoint 304 or destination. This may be achieved by receiving inputted destination information from the driver via the display 138, or similar from the GPS module 146. The computing platform 104 may also predict the waypoint 304 based on historical routes, for example, if the vehicle 102 typically travels from his or her workplace to his or her home each afternoon. Once the waypoint 304 is identified, the computing platform 104 may also determine or calculate the distance (in miles) and/or the duration to the waypoint 304 from the charge station 302 (i.e., distance D2.)

At block 525, the computing platform 104 may generate an alert via an interface 400 based on the temperatures and the waypoint 304. The alert may be similar to the alerts shown in FIGS. 4A-4C. The alerts may include textual alerts 402, as well as options 404, 406. As explained, the interface 400 may be generated based on the data provided by the temperature sensors 186, 184, as well as GPS module 146 and accelerometer 184. The interface 400 may provide the driver with selectable options that will optimize both driver comfort, as well as charge time/costs.

At block 530, the computing platform 104 may receive user input via the interface 400. As explained, the user may select to continue charging regardless of the increased time/costs. In other situations, the user may select to proceed with charging at an intermediate conditioning option.

At block 535, the computing platform 104 may transmit a command to the climate module 182 in response to the user input. That is, the climate module 182 may condition the vehicle 102, or not condition the vehicle 102, based on the input. The process then ends.

Furthermore, although the alerts are described as being displayed via the vehicle display 138, the alerts may be displayed via the mobile display 176, a vehicle heads up display (HUD), or other displays such as on other smart devices such as watches, glasses, cameras, tablets, etc. The alerts may be accompanied by sounds, or tactile alerts.

Accordingly, a climate conditioning system is described herein that provides information and alerts to the driver when conditioning the vehicle 102 during vehicle charging may increase the time and/or costs of the charging. Various gradient and iterative analysis' determine which, if any, type of alert is to be shown via an interface. The computing platform or controller may use vehicle speed, interior temperature, exterior temperature, and distance to a destination, in presenting an alert. Accordingly, the system aids the driver in optimizing comfort and charge time/costs.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A vehicle cabin conditioning system comprising:
an ambient temperature sensor;
a cabin temperature sensor;
a user interface; and
a controller programmed to present, via the interface, an alert in response to a cabin conditioning demand created by a temperature difference between ambient and cabin temperatures as detected by the sensors, wherein the alert indicates impact of the demand on vehicle charging.

2. The system of claim 1, wherein the alert includes at least one selectable charge option based on the temperature difference.

3. The system of claim 2, wherein the controller is further programmed to classify an ambient temperature detected by the ambient temperature sensor according to whether the ambient temperature falls within a predetermined range.

4. The system of claim 3, wherein the predetermined range includes temperatures less than 32 degrees Fahrenheit or temperatures greater than 90 degrees Fahrenheit.

5. The system of claim 3, wherein the alert includes a message indicating that the ambient temperature falls within the predetermined range.

6. The system of claim 1, wherein the alert includes selectable options including one option for continuing vehicle conditioning during vehicle charging and one option for discontinuing vehicle conditioning during vehicle charging.

7. The system of claim 1, further comprising a GPS module programmed to recognize a charge station for vehicle charging, wherein the controller is further programmed to present the alert in response to an approach toward the charge station.

8. The system of claim 7, wherein the GPS module is programmed to recognize the charge station based on historical vehicle charging at the charge station.

9. A system for creating cabin conditioning alerts during vehicle charging at a charge station, comprising:
a vehicle interface; and
a controller programmed to receive a waypoint, and to present via the interface at least one alert to indicate impact of vehicle conditioning on vehicle charging based on a distance between the waypoint and charge station.

10. The system of claim 9, wherein the controller is further programmed to estimate a vehicle conditioning demand based on ambient temperatures and the distance, and wherein the impact increases as the demand increases.

11. The system of claim 9, wherein the demand increases as a temperature difference between ambient and cabin temperatures increases.

12. The system of claim 11, wherein the at least one alert includes a selectable charge option dictated by the difference.

13. The system of claim 9, wherein the controller is further programmed to classify an ambient temperature according to whether the ambient temperature falls within a predetermined range.

14. The system of claim 13, wherein the predetermined range includes temperatures less than 32 degrees Fahrenheit or temperatures greater than 90 degrees Fahrenheit.

15. The system of claim 9, wherein the controller is further programmed to present the at least one alert in response to receiving an indication that a vehicle speed is decreasing as the waypoint approaches.

16. A vehicle interface system comprising:
a vehicle interface, and
a controller programmed to present, via the interface, a cabin conditioning screen including at least one alert that indicates a change to vehicle charge time based on predicted cabin conditioning during vehicle charging.

17. The system of claim 16, wherein the controller is further programmed to detect a temperature difference between an ambient temperature and a cabin temperature, and wherein the cabin conditioning screen includes at least one selectable option dictated by the temperature difference.

18. The system of claim 16, wherein the cabin conditioning screen includes a selectable option for continuing to condition a vehicle cabin during charging and for discontinuing conditioning of the vehicle cabin during charging.

* * * * *